US010247963B2

(12) United States Patent
Hernandez-Castaneda et al.

(10) Patent No.: US 10,247,963 B2
(45) Date of Patent: Apr. 2, 2019

(54) METHOD FOR OPTICAL DESIGN OF A PAIR OF OPHTHALMIC LENSES AND PAIR OF OPHTHALMIC LENSES THUS OBTAINED

(71) Applicant: ESSILOR INTERNATIONAL (COMPAGNIE GENERAL D'OPTIQUE), Charenton-le-pont (FR)

(72) Inventors: Martha Hernandez-Castaneda, Charenton-le-Pont (FR); Melanie Heslouis, Charenton-le-Pont (FR); Sarah Marie, Charenton-le-Pont (FR); Gildas Marin, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 16 days.

(21) Appl. No.: 15/522,474

(22) PCT Filed: Oct. 31, 2014

(86) PCT No.: PCT/FR2014/052783
§ 371 (c)(1),
(2) Date: Apr. 27, 2017

(87) PCT Pub. No.: WO2016/066909
PCT Pub. Date: May 6, 2016

(65) Prior Publication Data
US 2017/0357105 A1 Dec. 14, 2017

(51) Int. Cl.
*G02C 7/02* (2006.01)
*G02C 7/06* (2006.01)
*G02C 13/00* (2006.01)

(52) U.S. Cl.
CPC ............. *G02C 7/027* (2013.01); *G02C 7/024* (2013.01); *G02C 7/025* (2013.01); *G02C 7/028* (2013.01); *G02C 7/061* (2013.01); *G02C 13/005* (2013.01)

(58) Field of Classification Search
CPC .......... G02C 7/00; G02C 7/024; G02C 7/025; G02C 7/027; G02C 7/028; G02C 7/061; G02C 13/005
(Continued)

(56) References Cited

U.S. PATENT DOCUMENTS 8,529,063 B2 * 9/2013 Bonnin ................. A61B 3/113
351/209
8,733,931 B2 * 5/2014 Mousset ............ G01M 11/0228
351/159.75
(Continued)

FOREIGN PATENT DOCUMENTS

DE 10 2007 062 929 A1 7/2009
DE 10 2008 057 205 A1 5/2010
(Continued)

OTHER PUBLICATIONS

International Search Report issued in Application No. PCT/FR2014/052783, dated Jun. 30, 2015.

*Primary Examiner* — William A Alexander
(74) *Attorney, Agent, or Firm* — Young & Thompson

(57) ABSTRACT

Disclosed is a method for optical design of a pair of ophthalmic lenses for correcting spherical and cylindrical refractive errors of the eyes of a wearer, including a step of defining the need for spherical and cylindrical correction of the wearer for various viewing distances, and a step of determining the spherical and cylindrical power of the ophthalmic lenses at viewing points with various proximities, in accordance with the correction needs of the wearer. The power of at least one of the two ophthalmic lenses is determined such as to limit the deviation obtained therebetween upon adding equivalent spherical power between the viewing points with various proximities and/or varying the cylindrical power vector between the viewing points with
(Continued)

various proximities. Also disclosed is a pair of ophthalmic lenses designed according to such a method.

20 Claims, 1 Drawing Sheet

(58) Field of Classification Search
 USPC .................................................. 351/159.01
 See application file for complete search history.

(56) References Cited

U.S. PATENT DOCUMENTS

| | | | |
|---|---|---|---|
| 9,664,591 B2* | 5/2017 | Yamakaji | ........... G01M 11/0257 |
| 2006/0209255 A1 | 9/2006 | Donetti et al. | |
| 2010/0182566 A1 | 7/2010 | Becker et al. | |
| 2011/0051082 A1 | 3/2011 | Becken et al. | |
| 2011/0228225 A1* | 9/2011 | Liang | ...................... G02C 7/02 |
| | | | 351/159.01 |
| 2013/0027657 A1 | 1/2013 | Esser et al. | |

FOREIGN PATENT DOCUMENTS

| | | |
|---|---|---|
| DE | 10 2008 057 206 A1 | 5/2010 |
| DE | 10 2011 009 473 A1 | 11/2011 |
| EP | 2 208 457 A1 | 7/2010 |
| EP | 2 667 241 A1 | 11/2013 |
| WO | 2005-019905 A1 | 3/2005 |
| WO | 2010/054817 A1 | 5/2010 |
| WO | 2011/000845 A1 | 1/2011 |
| WO | 2011/134611 A1 | 11/2011 |
| WO | 2011/134632 A1 | 11/2011 |

* cited by examiner

METHOD FOR OPTICAL DESIGN OF A PAIR OF OPHTHALMIC LENSES AND PAIR OF OPHTHALMIC LENSES THUS OBTAINED

TECHNICAL FIELD OF THE INVENTION

The present invention generally relates to the field of the design of ophthalmic lenses for correcting cylindrical and spherical refractive defects of the two eyes of a wearer.

It more particularly relates to an optical method for designing a pair of such ophthalmic lenses.

It also relates to a pair of ophthalmic lenses designed according to such a method.

TECHNOLOGICAL BACKGROUND

The design of ophthalmic lenses intended to be mounted in a spectacle frame in order to correct the visual defects of a wearer is of particular importance in so far as whether this pair of spectacles will be acceptable or not depends to a large extent upon said design.

This design is in particular critical when it relates to progressive or multifocal lenses, and lenses intended to compensate for the astigmatism of the wearer.

As is known, the optical design of a pair of ophthalmic lenses for correcting cylindrical and spherical refractive defects of the two eyes of a wearer comprises:
  a step of defining the cylindrical and spherical correction requirements of the wearer for various vision proximities, and
  a step of determining cylindrical and spherical powers of said ophthalmic lenses at vision points of various proximities, depending on the previously defined cylindrical and spherical correction requirements of the wearer.

The first step may be carried out by an ophthalmologist who delivers an optical prescription to the wearer, this prescription comprising for each proximity, for example for far vision, intermediate vision and/or near vision:
  a sphere value in diopters for the correction of spherical ametropias, such as myopia or hypermetropia in far vision,
  a cylindrical value with the datum of its modulus in diopters and the datum of its axis in degrees, this cylinder having the aim of correcting any astigmatism of the wearer at the various proximities.

With such a differentiated prescription (right eye/left eye and far vision/near vision), the second step could in certain cases lead, without specific treatment, to disparate cylindrical and spherical powers, and thus to possible discomfort for the wearer.

SUBJECT OF THE INVENTION

In this context, the invention proposes an optical designing method such as defined in the introduction, wherein the powers of at least one of the two ophthalmic lenses are determined so as to limit the discrepancy obtained, between the two ophthalmic lenses of the pair, in at least one of the following quantities:
  the equivalent spherical power addition between the vision points of various proximities, and
  the variation in the cylindrical power vector between the vision points of various proximities.

Thus, a good binocular balance is obtained and the wearer may thus benefit from the advantages of the differentiated prescription without experiencing discomfort.

A method for manufacturing a pair of ophthalmic lenses thus designed is also proposed.

The following are other nonlimiting and advantageous features of the optical designing method according to the invention:
  the discrepancy obtained in one and/or the other of said quantities is smaller than a predefined threshold value;
  the discrepancy between the two ophthalmic lenses of the pair in the equivalent spherical power addition between the vision points of various proximities is smaller than 0.25 diopters;
  the discrepancy between the two ophthalmic lenses of the pair in the equivalent spherical power addition between the vision points of various proximities is smaller than 0.125 diopters;
  the discrepancy in the variation in the cylindrical power vector is determined according to the following rules:
    one of the two ophthalmic lenses of the pair having a minimal variation in the cylindrical power vector, this minimal variation being lower than 0.15 diopters, the variation in the cylindrical power vector of the other ophthalmic lens of the pair is lower than 0.3 diopters, or
    one of the two ophthalmic lenses of the pair having a minimal variation in the cylindrical power vector, this minimal variation being higher than or equal to 0.15 diopters, the variation in the cylindrical power vector of the other ophthalmic lens of the pair is lower than twice this minimal variation in the cylindrical power vector;
  the discrepancy in the variation in the cylindrical power vector between the vision points of various proximities is obtained by modifying the amplitude and/or the angle of the cylindrical power vector of one of the two ophthalmic lenses of the pair at a near-vision point;
  the powers of at least one of the two lenses is also determined so as to limit the difference obtained, for the two ophthalmic lenses of the pair, between the equivalent spherical power addition and the addition requirement;
  the difference obtained between the equivalent spherical power addition and the addition requirement is smaller than 0.25 diopters;
  the determination of the cylindrical and spherical powers of said at least one of the two ophthalmic lenses at vision points of various proximities is carried out in increments of 0.125 diopters;
  the determining step is carried out so that the cylindrical and spherical powers, at the vision points of the various proximities, of the ophthalmic lens intended to be placed in front of the dominant eye of the wearer correspond to the cylindrical and spherical correction requirements at said vision points of the wearer;
  said vision points of various proximities correspond to far-vision, intermediate-vision and/or near-vision points of the wearer;
  said vision points of various proximities correspond to far-vision and near-vision points of the wearer, and the cylindrical and spherical correction requirements of the wearer are defined on the basis of a measurement of the cylindrical and spherical refraction in far vision and in near vision of the two eyes of the wearer;
  said vision points of various proximities correspond to far-vision and near-vision points of the wearer, and the cylindrical and spherical correction requirements of the wearer are defined on the basis of a measurement of the cylindrical and spherical refraction in far vision of the two eyes of the wearer and of a measurement of the cylindrical and spherical refraction in near vision of at least one eye of the wearer;

said measurement of the cylindrical and spherical refraction in near vision is performed on the dominant eye of the wearer.

The step of defining the requirements may moreover comprise a substep of defining cylindrical correction requirements of the wearer for various vision proximities, which substep is carried out after a step of limiting the discrepancy obtained, between the two ophthalmic lenses of the pair, in the equivalent spherical power addition.

The invention also proposes a pair of ophthalmic lenses for correcting cylindrical and spherical refractive defects of the two eyes of a wearer, said pair of lenses being designed according to a designing method according to the invention.

DETAILED DESCRIPTION OF AN EXEMPLARY EMBODIMENT

The description which follows with reference to the appended drawings, which are given by way of nonlimiting examples, will make it easy to understand the essence of the invention and how it can be achieved.

Figure 4:
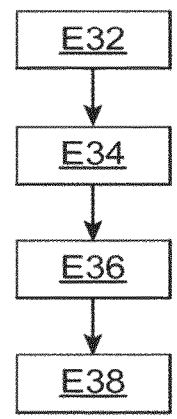

FIG. 4 schematically shows an example of a method for producing an ophthalmic lens on the basis of prescribed powers.

Figure 1:
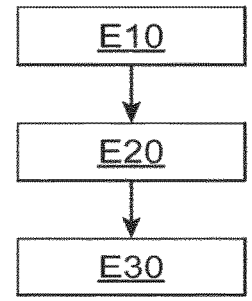
FIG. 1 is a flowchart showing the main steps used to obtain ophthalmic lenses in the context of the present invention.

FIG. 1 shows the main steps implemented with a view to obtaining ophthalmic lenses designed according to the invention.

This method starts with a step E10 of defining the cylindrical and spherical correction requirements of a wearer for at least two vision proximities, here in far vision and in near vision. As a variant, the correction requirements of the wearer could be defined for at least one another vision proximity, for example intermediate vision.

Two examples that are envisionable for the implementation of this step E10 are described below with reference to FIGS. 2 (step E110) and 3 (step E210), respectively.

The correction requirements of the wearer are for example expressed as follows, for at least one eye (denoted X below, which may be the right eye OD or left eye OG):

a spherical power value $R_X$ aiming to correct a spherical refractive defect in far vision (in general determined for each eye);

a cylindrical power vector $\vec{C_X}$ representing the modulus and angle of the cylindrical correction aiming to correct a cylindrical refractive defect (astigmatism) in far vision (in general determined for each eye);

the equivalent spherical power addition $AE_X$ for a vision proximity (here near vision) other than far vision, which represents the difference between the equivalent spherical power value for the other vision proximity (here near vision) and the equivalent spherical power value $R_{eq}$ for far vision;

the (vectorial) variation $\vec{VC_X}$ in the cylindrical power vector for a vision proximity (here near vision) other than far vision, which represents the vectorial difference between the vector $\vec{C_X^{VP}}$ representing the cylindrical correction for the other vision proximity (here near vision) and the vector $\vec{C_X}$ representing the cylindrical correction in far vision.

In other words: $\vec{C_X^{VP}} = \vec{C_X} + \vec{VC_X}$.

The equivalent (or average) spherical power is equal to the sum of the spherical power and of half the modulus of the cylindrical power vector; for far vision: $R_{eq} = R_X + \|\vec{C_X}\|/2$.

The method continues with a step E20 of determining cylindrical and spherical powers of two ophthalmic lenses (each ophthalmic lens being intended to be placed in front of one eye of the wearer) at vision points of various proximities, here in near vision and in far vision, depending on the requirements defined in step E10.

Cylindrical and spherical powers could be determined for points corresponding to at least one other vision proximity (for example intermediate vision) using the requirements defined for this other vision proximity in the aforementioned variant.

For at least one of the two ophthalmic lenses, the cylindrical and spherical powers are determined in step E20 in particular so as to limit the discrepancy between the equivalent spherical power addition for the right eye $AE_{OD}$ and the equivalent spherical power addition for the left eye $AE_{OG}$, and/or so as to limit the discrepancy between the variation in the cylindrical power vector for the right eye $\vec{VC_{OD}}$ and the variation in the cylindrical power vector for the left eye $\vec{VC_{OG}}$.

Two examples envisionable for the implementation of this step E20 are described below with reference to FIGS. 2 (step E120) and 3 (step E220), respectively.

Step E20 is followed by a step E30 of producing ophthalmic lenses on the basis of the cylindrical and spherical powers determined in step E20.

As will be clearly apparent from the example of implementation of this step given below for a lens with reference to FIG. 4, the step E30 essentially comprises defining at least one optical surface of the lens in question (this surface allowing the cylindrical and spherical powers determined in step E20 to be obtained) and manufacturing an ophthalmic lens having such an optical surface.

Figure 2:
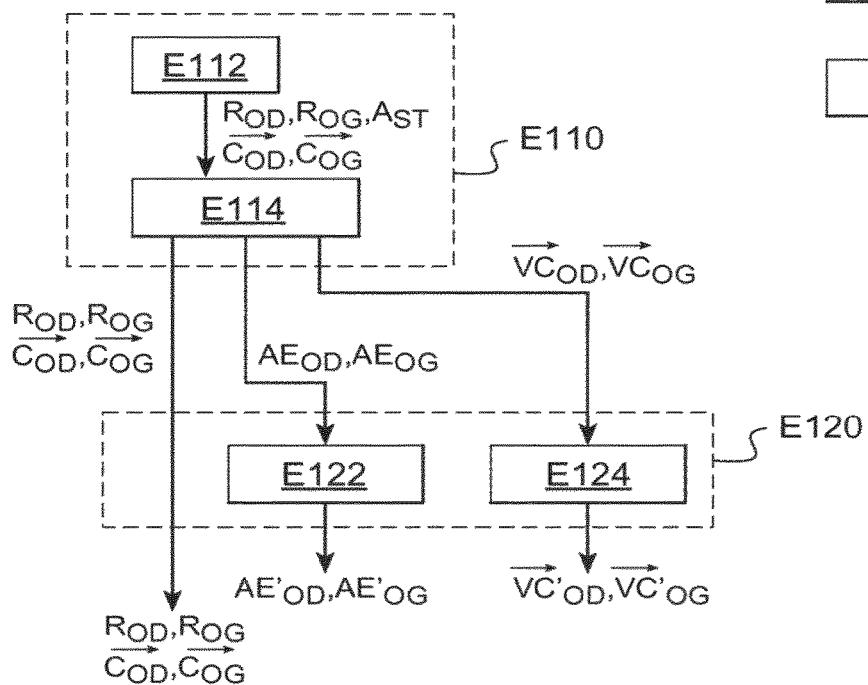
FIG. 2 shows a first example of a method according to the invention for determining prescribed powers.

FIG. 2 shows a first example of a method according to the invention for determining prescribed powers.

Such a method comprises a first step E110 of defining the cylindrical and spherical correction requirements of the wearer (which corresponds to the step E10 described above) and a second step E120 of determining cylindrical and spherical powers for two ophthalmic lenses intended to be placed in front of the eyes of the wearer (step E120 corresponding to step E20 described above).

The first step E110 starts with a substep E112 in which an optometrist prescribes certain correction values:

correction values in far vision (in particular, for each eye X, a spherical power value $R_X$ and a cylindrical power vector $\vec{C_X}$), which values are generally based on measurements carried out by the optometrist on the wearer (monocular refraction, correction of astigmatism, binocular balance, confirmation test), on complaints and the visual requirements of the wearer and on his binocular vision;

a standard addition value $A_{ST}$ (relating to another vision proximity, here near vision), which generally takes into account the age of the wearer, his working distance and his accommodation capacity, and which is used for both eyes (the positive spherical power for this standard addition being added symmetrically to both eyes).

The first step E112 is followed by a substep E114 of measuring subjective refraction for this other vision proximity (here near vision), using a tool adapted to this type of measurement, for example a phoropter or trial frames.

By virtue of such a tool, the monocular refraction of each eye is measured in step E114 at the desired observation distance (gaze axis and desired proximity, here near vision): spherical power, cylinder axis, cylindrical power, then optionally verification of the spherical power.

It is then possible to continue to balance the spherical powers between the two eyes (binocular balance) in order to equalize the accommodation brought to bear during monocular refraction; specifically, the two eyes are generally tested at different moments, and it is possible for the ocular pair not to have the same degree of accommodative relaxation during the examination of one or other eye.

Various methods for balancing spherical power may be used (vertical prisms, polarized filters, alternate occlusion, septum). With each disassociation method, the accommodative state of the two eyes may be compared using one of the following methods: the optotype method, the image-blur method, the duochrome-balance method.

The substep E114 optionally furthermore includes a measurement of visual performance (for example a measurement of monocular and/or binocular visual acuity) before and after this monocular reflection measurement in near vision (for example with trial frames providing a correction corresponding to the measured powers) in order to ensure that taking into account the monocular refraction improves visual performance.

The substep E114 therefore allows, for each eye X, the equivalent spherical power addition $AE_X$ for the other vision proximity (here near vision) and the variation $\overrightarrow{VC_X}$ in the cylindrical power vector for the other vision proximity (here near vision), to be obtained.

According to one variant envisionable for step E114, only the cylindrical power correction is measured for the other vision proximity (here near vision) so that the step E114 allows, for each eye X, only the variation $\overrightarrow{VC_X}$ in the cylindrical power vector for the other vision proximity (here near vision), to be defined. For each eye X, the equivalent spherical power addition $AE_X$ for the other vision proximity (here near vision) is in contrast determined on the basis of the standard addition $A_{ST}$ set by the optometrist in step E112, while adding thereto however 0.125 diopters of spherical power for any cylindrical power modification of 0.25 diopters modulus in order to maintain the equivalent spherical correction.

According to other embodiments envisionable for the step E110:
  all of the data (cylindrical and spherical correction requirements) for the various vision proximities (far vision and near vision in the example described here) are collected objectively using an aberrometer or an autorefractor;
  all of the data (cylindrical and spherical correction requirements) for the various vision proximities (far vision and near vision in the example described here) are collected subjectively by an optometrist;
  the cylindrical and spherical correction requirements for far vision are determined, subjectively, by an optometrist and the cylindrical and spherical correction requirements for another vision proximity (here near vision) are determined, objectively, using an aberrometer or an autorefractor;
  the cylindrical and spherical correction requirements for far vision are determined subjectively by an optometrist and those relating to another vision proximity (here near vision) are determined by adding, to the subjective far-vision prescription, the discrepancy measured objectively between far vision and near vision using an aberrometer or an autorefractor.

Once the cylindrical and spherical correction requirements have been defined (step E110 formed for example of substeps E112 and E114), the step E120 of determining cylindrical and spherical powers for the two ophthalmic lenses is passed to.

In the example described here, the cylindrical and spherical correction requirements in far vision (i.e. the spherical power values $R_{OD}$, $R_{OG}$ and the cylindrical power vectors $\overrightarrow{C_{OD}}$, $\overrightarrow{C_{OG}}$ determined in step E112) are used directly by way of cylindrical and spherical powers in the zones of the ophthalmic lenses that correspond to far vision.

In contrast, the two equivalent spherical power addition values $AE_{OD}$, $AE_{OG}$, obtained for the right eye and left eye, respectively, in step E114, are treated by means of a substep E122 of limiting the discrepancy between these two values (this discrepancy may be written as the absolute value of the difference between the two values: $|AE_{OD}-AE_{OG}|$).

If this discrepancy is (strictly) larger than a predefined threshold (for example 0.325 diopters or 0.25 diopters, or even 0.125 diopters), at least one of the two equivalent spherical power addition values $AE_{OD}$, $AE_{OG}$ is modified by means of step E122 so that the discrepancy (taking into account the modified value) is smaller than or equal to the predefined threshold, or even zero.

It is optionally possible to take into account, during the modification of equivalent spherical power addition value of step E122, the standard addition value $A_{ST}$ determined in step E112, for example by modifying in step E122 the spherical power addition value that is furthest from the standard addition value $A_{ST}$.

Thus, for example, if the requirements defined in step E110 are the following: $A_{ST}$=2.25 diopters, $AE_{OD}$=2.5 diopters, $AE_{OG}$=2.75 diopters, the equivalent spherical power addition value for the left eye $AE_{OG}$ (which value is furthest from the standard addition value $A_{ST}$) is modified so as to decrease the discrepancy between $AE_{OD}$ and $AE_{OG}$, for example by taking as modified equivalent spherical power addition value for the left eye $AE'_{OG}$=2.5 diopters.

The equivalent spherical power addition values $AE'_{OG}$, $AE'_{OD}$ after treatment by step E122 (i.e. the values possibly modified by this treatment) are used, in combination with the spherical power values $R_{OD}$, $R_{OG}$ in far vision, to obtain the spherical powers in the zones of the ophthalmic lenses that correspond to the other vision proximity characterized by this addition, here near vision.

Thus, the discomfort that could be caused to the wearer by an excessively differentiated (right eye/left eye) spherical power addition prescription is avoided.

According to one variant envisionable for step E122, the treatment carried out by this step consists in modifying at least one of the two equivalent spherical power addition values $AE_{OD}$, $AE_{OG}$ so as to cancel out any difference between these two values, for example by taking for the two eyes (and therefore in particular for the eye Y that is not dominant in far vision) the equivalent addition value $AE_Z$ measured in step E114 for the dominant eye Z.

In this case, the following values are obtained after treatment by the step E122: $AE'_{OG} = AE'_{OD} = AE_Z$ (only the value $AE_Y$ for the non-dominant eye therefore being modified by this step).

According to another variant envisionable for step E122, the treatment carried out in this step (which may optionally be combined with the treatments proposed above) consists in optionally modifying each equivalent spherical power addition value $AE_{OD}$, $AE_{OG}$ obtained in step E114 so that the discrepancy between this value $AE_{OD}$, $AE_{OG}$ and the standard addition value $A_{ST}$ obtained in step E112 is smaller than or equal to a predefined threshold, for example 0.25 diopters.

It will be noted that this variant also allows the discrepancy between the two equivalent spherical power addition values $AE_{OD}$, $AE_{OG}$ to be limited since, after possibly being modified in order to both be sufficiently close to the standard addition value $A_{ST}$, the equivalent spherical power addition values $AE'_{OD}$, $AE'_{OG}$ obtained at the end of step E112 will necessarily be close to each other.

According to another variant envisionable for step E122, the treatment carried out in this step consists in optionally modifying each equivalent spherical power addition value $AE_{OD}$, $AE_{OG}$ so as to cancel out any difference between each of these two values $AE_{OD}$, $AE_{OG}$ and the standard addition value $A_{ST}$ obtained in step E112.

The two variations in the cylindrical power vector $\vec{VC}_{OD}$, $\vec{VC}_{OG}$, which variations were obtained for the right eye OD and left eye OG, respectively, are also treated by means of a substep E124 of limiting the discrepancy between these two variations.

According to a first embodiment envisionable for the substep E124, the following treatment rules are applied:

if the modulus $\|\vec{VC}_Z\|$ of the variation in the cylindrical power factor for the dominant eye Z is smaller than a first predefined threshold (here 0.15 diopters), then the modulus $\|\vec{VC}_Y\|$ of the variation in the cylindrical power vector for the non-dominant eye Y is limited to a second predefined threshold, for example equal to twice the first predefined threshold (here the second threshold is 0.30 diopters);

if the modulus $\|\vec{VC}_Z\|$ of the variation in the cylindrical power vector for the dominant eye Z is larger than (or equal to) the first predefined threshold (here 0.15 diopters), then the modulus $\|\vec{VC}_Y\|$ of the variation in the cylindrical power vector for the non-dominant eye Y is limited proportionally to the modulus $\|\vec{VC}_Z\|$ of the variation in the cylindrical power vector for the dominant eye Z, for example to twice the modulus $\|\vec{VC}_Z\|$ in the variation of the cylindrical power vector for the dominant eye Z.

In other words, if the variation in the cylindrical power vector for the non-dominant eye Y after treatment by step E124 is denoted $\vec{VC'}_Y$, the treatment rule that was just described is written:

if $\|\vec{VC}_Z\| < 0.15$ and $\|\vec{VC}_Y\| < 0.3$, then $\vec{VC'}_Y = \vec{VC}_Y$ (the variation in the cylindrical power vector for the non-dominant eye is then unchanged by step E124);

if $\|\vec{VC}_Z\| < 0.15$ and $\|\vec{VC}_Y\| \geq 0.3$, then $\vec{VC'}_Y$ is chosen such that: $\|\vec{VC'}_Y\| = 0.3$ (the angle of the vector $\vec{VC'}_Y$ being identical to that of the vector $\vec{VC}_Y$), if $\|\vec{VC}_Z\| \geq 0.15$ and $\|\vec{VC}_Y\| < 2 \cdot \|\vec{VC}_Z\|$, then $\vec{VC'}_Y = \vec{VC}_Y$ (the variation in the cylindrical power vector for the non-dominant eye is then unchanged by step E124);

if $\|\vec{VC}_Z\| \geq 0.15$ and $\|\vec{VC}_Y\| \geq 2 \cdot \|\vec{VC}_Z\|$, then $\vec{VC'}_Y$ is chosen such that: $\|\vec{VC'}_Y\| = 2 \cdot \|\vec{VC}_Z\|$ (the angle of the vector $\vec{VC'}_Y$ being identical to that of the vector $\vec{VC}_Y$).

It will be noted that, in this embodiment, the variation in the cylindrical power vector $\vec{VC}_Z$ of the dominant eye Z is not modified by the step E124 (i.e. $\vec{VC'}_Z = \vec{VC}_Z$).

Specifically, it has been observed that the measurement carried out in step E122 in general defines a larger cylindrical-power-vector variation requirement for the non-dominant eye Y but also that an excessively unbalanced cylindrical-power-vector variation (between the right eye OD and the left eye OG) causes the wearer discomfort, this being avoided by virtue of the above treatment rules.

According to a second embodiment envisionable for the substep E124, the treatment carried out consists in limiting the variation in the cylindrical power vector the modulus of which is maximum, by taking into account the variation in the cylindrical power vector the modulus of which is minimum. (No modification is made to the variations in the cylindrical power vector if their two moduli are equal).

In other words, if the eye for which the modulus of the variation in the cylindrical power vector is minimum is denoted I (I is such that: $\|\vec{VC}_I\| = \min\{\|\vec{VC}_{OD}\|, \|\vec{VC}_{OG}\|\}$), and the eye for which the modulus of the variation in the cylindrical power vector is maximum is denoted J (J is such that: $\|\vec{VC}_J\| = \max\{\|\vec{VC}_{OD}\|, \|\vec{VC}_{OG}\|\}$), the modulus of the variation in the cylindrical power vector for the eye J is limited as follows:

if $\|\vec{VC}_I\| < 0.15$ and $\|\vec{VC}_J\| < 0.3$, then $\vec{VC'}_J = \vec{VC}_J$;

if $\|\vec{VC}_I\| < 0.15$ and $\|\vec{VC}_J\| \geq 0.3$, then $\vec{VC'}_J$ is chosen such that: $\|\vec{VC'}_J\| = 0.3$ (the angle of the vector $\vec{VC'}_J$ being identical to that of the vector $\vec{VC}_J$), if $\|\vec{VC}_I\| \geq 0.15$ and $\|\vec{VC}_J\| < 2 \cdot \|\vec{VC}_I\|$, then $\vec{VC'}_J = \vec{VC}_J$;

if $\|\vec{VC}_I\| \geq 0.15$ and $\|\vec{VC}_J\| \geq 2 \cdot \|\vec{VC}_I\|$, then $\vec{VC'}_J$ is chosen such that: $\|\vec{VC'}_J\| = 2 \cdot \|\vec{VC}_I\|$ (the angle of the vector $\vec{VC'}_J$ being identical to that of the vector $\vec{VC}_J$).

It is proposed in this embodiment not to modify the variation in the cylindrical power vector $\vec{VC}_I$ of the eye I for which the modulus of this variation is minimum (i.e. $\vec{VC'}_I = \vec{VC}_I$).

According to a third embodiment envisionable for the substep E124, the variation in the cylindrical power vector $\vec{VC}_Y$ for the non-dominant eye Y may be modified so as to be equal in modulus to the variation in the cylindrical power vector $\vec{VC}_Z$ for the dominant eye Z (i.e. $\|\vec{VC'}_Y\| = \|\vec{VC}_Z\|$), for example when the discrepancy between these two variations is large (i.e. larger than a predefined threshold) in modulus and/or an angle. The direction of the cylindrical power vector $\vec{VC}_Y$ for the non-dominant eye Y is for example for its part chosen so that the angle of variation of the astigmatism is of opposite sign for the two eyes.

Whatever the embodiment implemented, the variations in the cylindrical power vector $\vec{VC'}_{OD}$, $\vec{VC'}_{OG}$ that are obtained after treatment by step E124 are used, in combination with the cylindrical power vectors $\vec{C}_{OD}$, $\vec{C}_{OG}$ in far vision, to obtain the cylindrical powers of the ophthalmic lenses in the regions of these ophthalmic lenses that correspond to near vision, respectively.

Step E120 furthermore optionally includes, after the treatments of steps E122 and E124 that have just been described, a measurement of visual performance (for example a measure of binocular and/or monocular visual acuity, typically with trial frames providing a correction corresponding to the determined powers) in order to ensure that taking into account the variations in the cylindrical power vector for near vision improves visual performance.

According to one envisionable variant, rather than performing all the actions of step E114 then next those of step E120 as described above, it would be possible to proceed as follows:

perform in step E114 only the actions relating to the spherical correction (in particular the determination of the equivalent spherical power addition values $AE_{OD}$, $AE_{OG}$);

perform the actions of substep E122 (limitation of the discrepancies for the equivalent spherical power addition);

perform in step E114 the actions relating to the cylindrical correction (taking into account the modified equivalent spherical power addition values $AE'_{OD}$, $AE'_{OG}$ obtained by means of substep E122, thereby allowing the measurements carried out in the present step to be improved);

perform the actions of substep E124.

Figure 3:
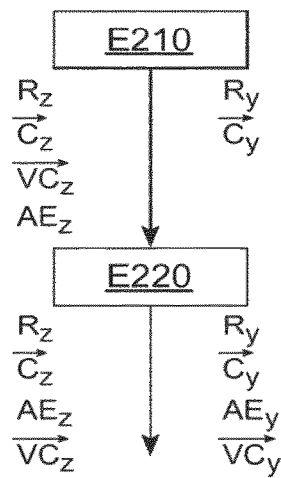
FIG. 3 shows a second example of a method according to the invention for determining prescribed powers.

FIG. 3 shows a second example of a method according to the invention for determining prescribed powers.

Such a method comprises a first step E210 of defining the cylindrical and spherical correction requirements of the wearer (which corresponds to the step E10 described above) and a second step E220 of determining cylindrical and spherical powers for two ophthalmic lenses intended to be placed in front of the eyes of the wearer (step E220 corresponding to step E20 described above).

Step E210 comprises measuring for one of the two eyes of the wearer, here the dominant eye Z (for which the measurements are in general more stable), cylindrical and spherical correction requirements, for a plurality of vision proximities (here in far vision and in near vision).

This therefore makes it possible to define:

the spherical power value $R_Z$ of correction in far vision for the dominant eye Z;

the cylindrical power vector $\vec{C}_Z$ of correction in far vision for the dominant eye Z;

the equivalent spherical power addition $AE_Z$ for another vision proximity (here near vision);

the variation $\vec{VC}_Z$ in the cylindrical power vector for the other vision proximity (here near vision).

Measurements in far vision for the other eye, here the non-dominant eye Y, are also carried out in step E210, thereby making it possible to define:

the spherical power value $R_Y$ of correction in far vision for the non-dominant eye Y;

the cylindrical power vector $\vec{C}_Y$ of correction in far vision for the non-dominant eye Y.

For example, for these measurements, the same techniques as those described above with reference to step E114 are used (applied this time to far vision and to near vision).

During step E220, the results from the step E210 are used without modification in order to determine the cylindrical and spherical powers of the two ophthalmic lenses.

However, in order to determine the cylindrical and spherical powers for the near vision for the ophthalmic lens associated with the eye for which no measurement was carried out in near vision (here the non-dominant eye Y), the equivalent spherical power addition $AE_Y$ and the variation in the cylindrical power vector $\vec{VC}_Y$ for this eye are determined as follows in step E220:

the equivalent spherical power addition $AE_Y$ is chosen equal to that relating to the other eye $AE_Z$;

the variation in the cylindrical power vector $\vec{VC}_Y$ is chosen so that its modulus is close or identical to the modulus $\|\vec{VC}_Z\|$ of the variation in the cylindrical power vector relating to the other eye, its orientation being chosen so as to obtain a variation in cylindrical correction angle of opposite sign for the two eyes.

For example, in the case described here where the eye for which the measurements have been carried out is the dominant eye Z:

if $\|\vec{VC}_Z\|<0.15$, then $\vec{VC}_Y$ is chosen such that $\|\vec{VC}_Y\|<0.3$;

if $\|\vec{VC}_Z\|\geq 0.15$, then $\vec{VC}_Y$ is chosen such that $\|\vec{VC}_Y\|<2\cdot\|\vec{VC}_Z\|$.

As a variant, when the eye for which the measurements have been carried out is the non-dominant eye Y (in which case the variation in the cylindrical power vector $\vec{VC}_Y$ is already determined for this eye Y), the variation in the cylindrical power vector $\vec{VC}_Z$ for the dominant eye Z is for example chosen such that:

$$\|\vec{VC}_Z\|\leq\|\vec{VC}_Y\|.$$

According to one envisionable variant, provision may be made in step E220 for the equivalent spherical power addition $AE_Z$ obtained in step E210 to optionally be modified so as to limit the discrepancy between this value $AE_Z$ and the standard addition $A_{ST}$ (mentioned above in the context of the description of FIG. 2) to a predefined threshold (for example 0.25 diopters). For example, if the standard addition $A_{ST}$ is 3 diopters and the equivalent addition $AE_Z$ is 2.5 diopters, the latter is modified so as to equal 2.75 diopters.

FIG. 4 schematically shows an example of a method for producing an ophthalmic lens on the basis of prescribed powers, which corresponds to the aforementioned step E30. Naturally, this method will have to be implemented for each of the two ophthalmic lenses of the pair of lenses prescribed to the wearer.

This method starts with a step E32 of determining a target variation law for the cylindrical power correction.

The symbols α and β are used to denote angles that define a direction of the gaze with respect to the eye rotation centre: α is the angle made between the direction of the gaze and the horizontal plane containing the eye rotation centre; β is the angle made between the direction of the gaze and the vertical plane containing the eye rotation centre.

In step E32 the cylindrical correction (modulus, axis) to be provided for all the gaze directions passing through (under the standard conditions of wear of the spectacles, which conditions are referred to as the "as worn" conditions) the ophthalmic lens is defined on the basis of the prescribed powers obtained in step E20.

In the example described here, three zones are defined:
- the gaze directions for which $\alpha < \alpha_{min}$ (regardless of $\beta$), which correspond to far vision;
- the gaze directions for which $\alpha > \alpha_{max}$ (regardless of $\beta$), which correspond to far vision;
- the gaze directions for which $\alpha_{min} \leq \alpha \leq \alpha_{max}$, which correspond to an intermediate zone.

According to one first possible embodiment, a law of linear variation with $\alpha$ is used in the intermediate zone to define the modulus and the axis of the cylindrical correction to be provided.

If the eye corresponding to the ophthalmic lens constructed here is denoted X, and the values of the modulus and angle of the desired cylindrical correction are denoted Cyl and Axe, respectively, then:

$Cyl(\alpha) = \|\vec{C_X}\|$ and $Axe(\alpha) = \arg \vec{C_X}$ for $\alpha < \alpha_{min}$ (where $\arg \vec{V}$ is the function that gives the angle of the vector $\vec{V}$);

$Cyl(\alpha) = \lambda(\alpha) \cdot \|\vec{C_X}\| + \mu(\alpha) \cdot \|\vec{C_X} + \vec{VC_X}\|$ and $Axe(\alpha) = \lambda(\alpha) \cdot \arg \vec{C_X} + \mu(\alpha) \cdot \arg(\vec{C_X} + \vec{VC_X})$ for $\alpha_{min} \leq \alpha \leq \alpha_{max}$, with $\lambda(\alpha) = (\alpha_{max} - \alpha)/(\alpha_{max} - \alpha_{min})$ and $\mu(\alpha) = (\alpha - \alpha_{min})/(\alpha_{max} - \alpha_{min})$, $Cyl(\alpha) = \|\vec{C_X} + \vec{VC_X}\|$ and $Axe(\alpha) = \arg(\vec{C_X} + \vec{VC_X})$ for $\alpha > \alpha_{max}$.

According to one second possible embodiment, the quantities M, J0 and J45 are used, these quantities conventionally being defined as: $M = S + C/2$, $J0 = -(C/2) \cos 2A$; $J45 = -(C/2) \cdot \sin 2A$, with S the spherical power, C the cylindrical power (modulus) and A the cylinder angle.

It is thus possible to define the following quantities on the basis of the prescribed powers obtained in step E20 for the eye X in question:

in far vision, $$M_{FV} = R_X + \frac{\|\vec{C_X}\|}{2}; J0_{FV} = -\frac{\|\vec{C_X}\|}{2} \cdot \cos[2 \cdot \arg \vec{C_X}];$$

$$J45_{FV} = -\frac{\|\vec{C_X}\|}{2} \cdot \sin[2 \cdot \arg \vec{C_X}];$$

in near vision $$M_{NV} = M_{FV} + AE_X + \frac{\|\vec{C_X + VC_X}\|}{2};$$

$$J0_{NV} = -\frac{\|\vec{C_X + VC_X}\|}{2} \cdot \cos[2 \cdot \arg(\vec{C_X + VC_X})];$$

$$J45_{NV} = -\frac{\|\vec{C_X + VC_X}\|}{2} \cdot \sin[2 \cdot \arg(\vec{C_X + VC_X})];$$

The values $M_{FV}$, $J0_{FV}$, $J45_{FV}$ are used for the zone corresponding to far vision ($\alpha < \alpha_{min}$) and the values $M_{NV}$, $J0_{NV}$, $J45_{NV}$ are used for the zone corresponding to near vision ($\alpha > \alpha_{max}$).

For the intermediate zone ($\alpha_{min} \leq \alpha_i \leq \alpha_{max}$), the following values are used (with $\alpha_i = a_1 \beta i + b_1$ where $a_1$ and $b_1$ are constants):

$M(\alpha_i) = \lambda(\alpha_i) \cdot M_{FV} + \mu(\alpha_i) \cdot M_{NV}$, $J0(\alpha_i) = \lambda(\alpha_i) \cdot J0_{FV} + \mu(\alpha_i) \cdot J0_{NV}$, $J45(\alpha_i) = \lambda(\alpha_i) \cdot J45_{FV} + \mu(\alpha_i) \cdot J45_{NV}$, the parameters $\lambda(\alpha_i)$ and $\mu(\alpha_i)$ being defined as indicated above for the first possible embodiment.

The method of FIG. 4 continues with a step E34 of determining a meridian spatial profile on the basis in particular of the target variation law obtained in step E32.

According to one first possible embodiment of step E34, ray tracing is used to define for each gaze direction points belonging to the profile of the meridian. According to this possible embodiment, step E34 comprises the following substeps:
- defining an ergorama (i.e. the datum of the distance of the observed object for each direction of the gaze);
- modelling the ophthalmic lens and calculating the power for each gaze direction ($\alpha$, $\beta$) depending on object distance, on the basis of the variation law defined in step E32;
- tracing the ray connecting the object to the eye rotation centre;
- retrieving the point of impact on the front face of the ophthalmic lens.

Each point thus determined by this procedure belongs to the spatial profile of the meridian sought in step E34.

According to a second possible embodiment of step E34, a model taking into account prismatic effects related to the power of the eyeglass (average power, astigmatism and axis) for each direction of the gaze is used. Thus the points belonging to the spatial profile of the meridian are defined. Since the new meridian profile is known, the definition of the surface may be clipped so as to be shifted to this profile.

A step E36 of optimizing the optical surface of the ophthalmic lens is then carried out, for example on the basis of the atorization method described in patent application EP 990 939.

In the context of this method, a lens possessing the prescribed cylindrical and spherical powers, obtained in step E20, both for far vision and for near vision, is for example used as reference lens; the target lens corresponds to the design that it is desired to deliver to the wearer (with the optics of a spherical eyeglass, for example).

The aforementioned optimizing method (described in patent application EP 930 939) is then implemented, which adapts the geometry of the lens so as to minimize, for each gaze direction, the discrepancies between the optical performance obtained with the target lens and that obtained with the reference lens, while taking into account the cylindrical power variation law determined in step E32 and the equivalent spherical power addition value $AE_X$.

During the optimization, the astigmatism (modulus, axis) and equivalent spherical power values are therefore determined while taking into account the prescriptions for each gaze direction, i.e. the prescriptions evaluated as indicated above from the prescribed cylindrical and spherical powers (obtained in step E30) and from the chosen variation law (here this law is linear, as explained in step E32).

Thus an optimized definition of the surfaces of the ophthalmic lens is obtained.

According to one variant envisionable for step E36, the atorization method is implemented without taking into account the prescription variation related to the cylindrical power and the layers are then added to obtain the required cylindrical power variation.

According to this variant, the reference lens is a lens possessing the prescribed spherical powers, obtained in step E20, both for far vision and for near vision (namely the values $R_X$ and $AE_X$ for the eye X); the target lens corresponds to the design that it is desired to deliver to the wearer (with the optics of a spherical eyeglass, for example).

Next, a combination of layers is used so as to minimize as best as possible the difference between the prescribed powers obtained in step E20, as for example described in patent application WO2011/000 845. The method described in this patent application also uses an optimization algorithm, in which the prescriptions for each gaze direction, i.e. the prescriptions evaluated as indicated above from the prescribed cylindrical and spherical powers (obtained in step E30) and from the chosen variation law, will be taken into account.

The method of FIG. 4 terminates in the step E38 with the manufacture (for example by machining) of an ophthalmic lens having the surfaces defined by virtue of step E36.

The ophthalmic lens in step E36 may be a progressive lens, a regressive lens, a multifocal lens of the bifocal or trifocal type, or a unifocal lens.

In the case of a progressive, regressive or trifocal lens, the eyeglass has zones defined for near vision, intermediate vision and far vision, and the invention may be applied by choosing the points of various proximities from at least 2 zones, for at least one of 2 quantities chosen from the addition quantity and/or the cylindrical-variation quantity. For example, it is possible to choose 2 points of various proximities by taking a point belonging to the far-vision zone, and another point belonging to the near-vision zone of a progressive lens and to apply the invention to the relevant quantities i.e. the equivalent spherical power addition and the variation in the cylindrical vector.

In the case of a bifocal eyeglass, the eyeglass has zones defined for near vision and far vision, and the invention may be applied to the addition quantity and/or to the cylindrical-variation quantity by choosing 1 point in the far-vision zone and a second point of different proximity in the near-vision zone.

In the case of a unifocal eyeglass, it is for example possible to apply the invention to the cylinder-variation quantity, by defining a first point at the center of the eyeglass, corresponding to a use of the eyeglass in far vision, and a second point in a lower zone of the eyeglass corresponding to a use of the eyeglass in near vision.

The invention claimed is:

1. A method for obtaining a pair of ophthalmic lenses for correcting cylindrical and spherical refractive defects of the two eyes of a wearer, including:
   a step of defining the cylindrical and spherical correction requirements of the wearer for various vision proximities,
   a step of determining cylindrical and spherical powers of said ophthalmic lenses at vision points of various proximities, depending on the previously defined cylindrical and spherical correction requirements of the wearer, and
      a step of producing said ophthalmic lenses on the basis of the determined cylindrical and spherical powers,
   wherein the powers of at least one of the two ophthalmic lenses are determined so as to limit the discrepancy obtained, between the two ophthalmic lenses of the pair, in at least one of the following quantities:
   the equivalent spherical power addition between the vision points of various proximities, and
   the variation in the cylindrical power vector between the vision points of various proximities.

2. The method as claimed in claim 1, wherein the discrepancy obtained in one and/or the other of said quantities is smaller than a predefined threshold value.

3. The method as claimed in claim 2, wherein the discrepancy between the two ophthalmic lenses of the pair in the equivalent spherical power addition between the vision points of various proximities is smaller than 0.25 diopters.

4. The method as claimed in claim 2, wherein the discrepancy between the two ophthalmic lenses of the pair in the equivalent spherical power addition between the vision points of various proximities is smaller than 0.125 diopters.

5. The method as claimed in claim 1, wherein the discrepancy in the variation in the cylindrical power vector between the vision points of various proximities is obtained by modifying the amplitude and/or the angle of the cylindrical power vector of one of the two ophthalmic lenses of the pair at a near-vision point.

6. The method as claimed in claim 1, wherein, the powers of at least one of the two lenses is also determined so as to limit the difference obtained, for the two ophthalmic lenses of the pair, between the equivalent spherical power addition and the addition requirement.

7. The method as claimed in claim 6, wherein the difference obtained between the equivalent spherical power addition and the addition requirement is smaller than 0.25 diopters.

8. The method as claimed in claim 1, wherein the determination of the cylindrical and spherical powers of said at least one of the two ophthalmic lenses at vision points of various proximities is carried out in increments of 0.125 diopters.

9. The method as claimed in claim 1, wherein the determining step is carried out so that the cylindrical and spherical powers, at the vision points of the various proximities, of the ophthalmic lens intended to be placed in front of the dominant eye of the wearer correspond to the cylindrical and spherical correction requirements at said vision points of the wearer.

10. The method as claimed in claim 1, wherein said vision points of various proximities correspond to far-vision, intermediate-vision and/or near-vision points of the wearer.

11. The method as claimed in claim 1, wherein said vision points of various proximities correspond to far-vision and near-vision points of the wearer, and the cylindrical and spherical correction requirements of the wearer are defined on the basis of a measurement of the cylindrical and spherical refraction in far vision and in near vision of the two eyes of the wearer.

12. The method as claimed in claim 1, wherein said vision points of various proximities correspond to far-vision and near-vision points of the wearer, and the cylindrical and spherical correction requirements of the wearer are defined on the basis of a measurement of the cylindrical and spherical refraction in far vision of the two eyes of the wearer and of a measurement of the cylindrical and spherical refraction in near vision of at least one eye of the wearer.

13. The method as claimed in claim 12, wherein said measurement of the cylindrical and spherical refraction in near vision is performed on the dominant eye of the wearer.

14. The method as claimed in claim 1, wherein the step of defining the requirements comprises a substep of defining cylindrical correction requirements of the wearer for various vision proximities, which substep is carried out after a step of limiting the discrepancy obtained, between the two ophthalmic lenses of the pair, in the equivalent spherical power addition.

15. A pair of ophthalmic lenses for correcting cylindrical and spherical refractive defects of the two eyes of a wearer, said pair of lenses being obtained according to an optical designing method as claimed in claim 1.

16. The method as claimed in claim 2, wherein the discrepancy in the variation of the cylindrical power vector is determined according to the following rules:
  one of the two ophthalmic lenses of the pair having a minimal variation in the cylindrical power vector, this minimal variation being lower than 0.15 diopters, the variation in the cylindrical power vector of the other ophthalmic lens of the pair is lower than 0.3 diopters, or
  one of the two ophthalmic lenses of the pair having a minimal variation in the cylindrical power vector, this minimal variation being higher than or equal to 0.15 diopters, the variation in the cylindrical power vector of the other ophthalmic lens of the pair is lower than twice this minimal variation in the cylindrical power vector.

17. The method as claimed in claim 2, wherein the discrepancy in the variation in the cylindrical power vector between the vision points of various proximities is obtained by modifying the amplitude and/or the angle of the cylindrical power vector of one of the two ophthalmic lenses of the pair at a near-vision point.

18. The method as claimed in claim 3, wherein the discrepancy in the variation in the cylindrical power vector between the vision points of various proximities is obtained by modifying the amplitude and/or the angle of the cylindrical power vector of one of the two ophthalmic lenses of the pair at a near-vision point.

19. The method as claimed in claim 4, wherein the discrepancy in the variation in the cylindrical power vector between the vision points of various proximities is obtained by modifying the amplitude and/or the angle of the cylindrical power vector of one of the two ophthalmic lenses of the pair at a near-vision point.

20. A method for obtaining a pair of ophthalmic lenses for correcting cylindrical and spherical refractive defects of the two eyes of a wearer, including:
  a step of defining the cylindrical and spherical correction requirements of the wearer for various vision proximities,
  a step of determining cylindrical and spherical powers of said ophthalmic lenses at vision points of various proximities, depending on the previously defined cylindrical and spherical correction requirements of the wearer, and
  a step of producing said ophthalmic lenses on the basis of the determined cylindrical and spherical powers,
  wherein the powers of at least one of the two ophthalmic lenses are determined so as to limit the discrepancy obtained, between the two ophthalmic lenses of the pair, in at least one of the following quantities:
    the equivalent spherical power addition between the vision points of various proximities, and
    the variation in the cylindrical power vector between the vision points of various proximities, and
  wherein the discrepancy in the variation of the cylindrical power vector is determined according to the following rules:
    one of the two ophthalmic lenses of the pair having a minimal variation in the cylindrical power vector, this minimal variation being lower than 0.15 diopters, the variation in the cylindrical power vector of the other ophthalmic lens of the pair is lower than 0.3 diopters, or
    one of the two ophthalmic lenses of the pair having a minimal variation in the cylindrical power vector, this minimal variation being higher than or equal to 0.15 diopters, the variation in the cylindrical power vector of the other ophthalmic lens of the pair is lower than twice this minimal variation in the cylindrical power vector.

* * * * *